US008424948B2

(12) United States Patent
Krajenke et al.

(10) Patent No.: US 8,424,948 B2
(45) Date of Patent: Apr. 23, 2013

(54) VEHICLE WITH DECKLID HOLD-OPEN ASSIST

(75) Inventors: Gary W. Krajenke, Warren, MI (US); Alvin N. Standard, Clarkston, MI (US); Edward L Schulte, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 57 days.

(21) Appl. No.: 13/221,434

(22) Filed: Aug. 30, 2011

(65) Prior Publication Data

US 2013/0048398 A1 Feb. 28, 2013

(51) Int. Cl.
*B62D 25/10* (2006.01)

(52) U.S. Cl.
USPC .......... 296/76

(58) Field of Classification Search .......... 296/76, 296/146.11, 146.12, 107.08; 16/221
See application file for complete search history.

(56) References Cited

U.S. PATENT DOCUMENTS 2,551,054 A * 5/1951 Sanmori .......... 49/140
2,810,153 A 10/1957 Semar
2,871,505 A 2/1959 Clark et al.
2,894,277 A 7/1959 Bogater et al.
2,986,770 A 6/1961 Hammond
3,085,286 A 4/1963 Whitehouse et al.
3,273,935 A * 9/1966 Carson .......... 296/76
3,476,375 A 11/1969 Brasseur
3,558,184 A * 1/1971 Plegat .......... 296/146.11
3,643,755 A 2/1972 Gionet et al.
4,186,476 A 2/1980 Mair et al.
4,580,315 A 4/1986 Beckwith
4,776,626 A 10/1988 Seyler
5,210,906 A * 5/1993 Aihara et al. .......... 16/232
5,234,738 A 8/1993 Wolf
5,361,455 A 11/1994 Kiefer
5,465,852 A 11/1995 Koks et al.
5,584,099 A 12/1996 Westerdale
5,664,289 A 9/1997 Wolda et al.
5,864,214 A * 1/1999 Brodsky .......... 318/282
5,873,619 A 2/1999 Lewkoski et al.
5,967,586 A 10/1999 Duffy et al.
6,382,704 B1 5/2002 Nastasoiu
7,469,953 B2 12/2008 Heath et al.
7,714,595 B2 * 5/2010 Fujiwara et al. .......... 324/663
7,815,241 B2 10/2010 Renke et al.
7,971,393 B2 * 7/2011 Gao et al. .......... 49/386
2006/0230578 A1 10/2006 Renke et al.

* cited by examiner

*Primary Examiner* — Lori Lyjak
(74) *Attorney, Agent, or Firm* — Ingrassia Fisher & Lorenz, P.C.

(57) ABSTRACT

In accordance with exemplary embodiments, a magnetic decklid hold-open system is provided for a vehicle. The system comprises a decklid for a vehicle coupled to a body of the vehicle via a hinge strap. The hinge strap facilitates the decklid moving between a closed position and an open position, and a magnetic element coupled to the hinge strap magnetically retains the decklid in the open position.

20 Claims, 6 Drawing Sheets

VEHICLE WITH DECKLID HOLD-OPEN ASSIST

TECHNICAL FIELD

The technical field generally relates to decklids for vehicles, and more particularly to a magnetic decklid hold-open assist feature for the vehicle.

BACKGROUND

It is known to provide a closure such as a decklid for a vehicle to open and close a rear compartment or trunk of the vehicle. Typically, the decklid is attached to the vehicle body with at least one, preferably a pair of, laterally spaced hinges. Generally, decklid hinge systems include a hinge strap coupled to the hinge and the decklid allowing motion of the decklid from a fully open position to a fully closed position. Springs or gas struts are often used to provide an opening force for the decklid that also assists in holding the decklid open and not allowing the decklid to unexpectedly close which may cause injury. To prevent unexpected closure, the springs or gas struts are selected to have a hold-open force in excess of that needed to assist in raising the decklid toward the open position. However, this design choice results in the use of larger springs and gas struts that occupy more physical space and are more expensive than using springs or gas struts merely to assist in raising the decklid.

Accordingly, it is desirable to provide a decklid hold-open assist feature for a vehicle. Also, it is desirable to provide a hold-open assist feature that reduces the hold-open force required to be provided by the springs or gas struts. Additionally, other desirable features and characteristics of the present invention will become apparent from the subsequent description taken in conjunction with the accompanying drawings and the foregoing technical field and background.

BRIEF SUMMARY

In accordance with exemplary embodiments, a magnetic decklid hold-open system is provided for a vehicle. The system comprises a decklid for a vehicle coupled to a body of the vehicle via a hinge strap. The hinge strap facilitates the decklid moving between a closed position and an open position, and a magnetic element coupled to the hinge strap magnetically retains the decklid in the open position.

In accordance with exemplary embodiments, a magnetic decklid hold-open system is provided for a vehicle. The system comprises a decklid for a vehicle coupled to a body of the vehicle via a hinge strap. The hinge strap facilitates the decklid moving between a closed position and an open position, and a magnetic assembly coupled to the hinge strap magnetically retains the decklid in the open position. The magnetic assembly includes a plurality of magnets interleaved with a plurality of insulating spacers, with pairs of the plurality of insulating spacers having a deformable hinge therebetween. The magnetic assembly also includes end caps having mounting members and providing a loading force to retain the magnetic assembly coupled to the hinge strap so that the magnetic assembly can magnetically couples to a portion of the vehicle body to retain the decklid in the open position.

DESCRIPTION OF THE DRAWINGS

The subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-6 are merely illustrative and may not be drawn to scale.

Figure 1:
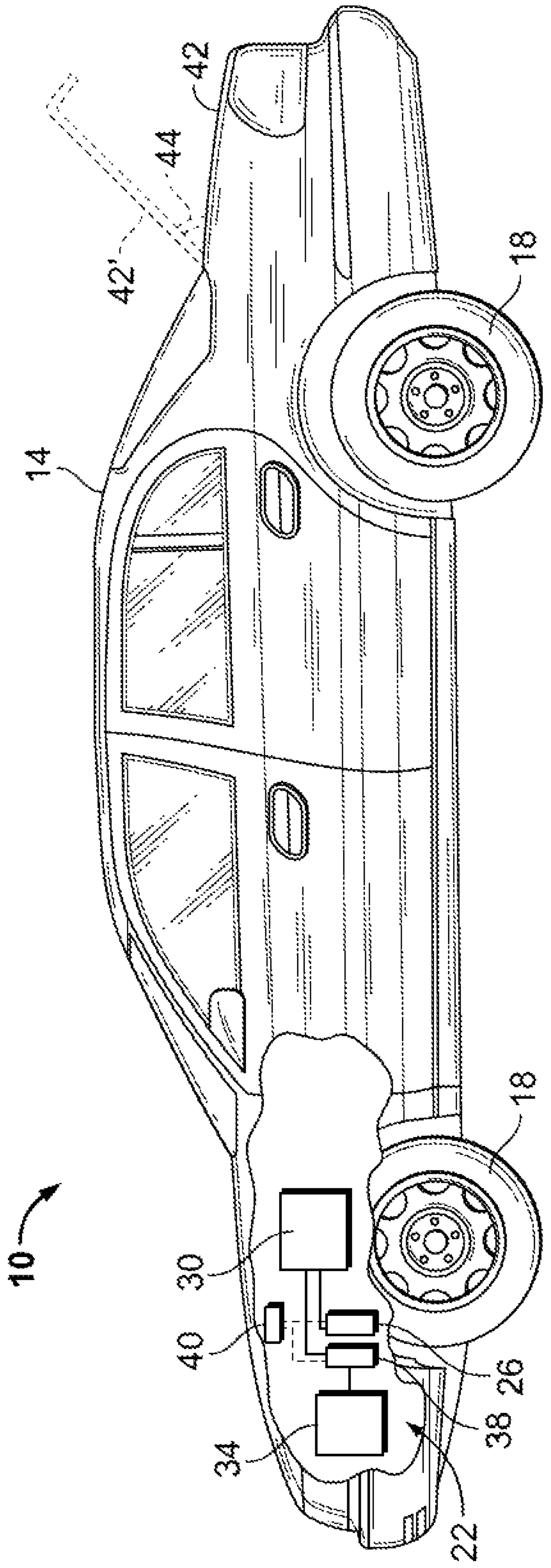
FIG. 1 is an illustration of a vehicle suitable for using exemplary embodiments of the present disclosure.

Referring to the drawings, wherein like reference numbers refer to like components, FIG. 1 shows a vehicle 10 suitable for use with the exemplary embodiments of the present disclosure. The vehicle 10 includes a vehicle body 14 and has a plurality of wheels 18 rotatably mounted with respect to the body 14 and configured to support the body 14 on the ground or road. The vehicle 10 also includes a powertrain 22. In the embodiment depicted, the powertrain 22 includes an electric motor 26 operatively connected to at least one of the wheels 18 to transfer power (torque) thereto for propelling the vehicle 10. The powertrain 22 also includes a battery 30 operatively connected to the motor 26 and configured to selectively supply electrical energy to the motor 26. The powertrain 22 in the embodiment depicted further includes an engine 34 and a generator 38. The engine 34 is operatively connected to the generator 38 to drive the generator 38, which causes the generator 38 to generate electrical energy. The generator 38 is operatively connected to the battery 30 to supply electrical energy thereto for recharging the battery 30. The generator 38 is also operatively connected to the motor 26 to selectively supply electrical energy thereto. A powertrain control module 40 controls the flow of electrical energy between the generator 38, the motor 26, and the battery 30, depending on the driver power command, the state of charge of the battery 30, etc.

The powertrain 22 in the embodiment depicted is commonly referred to as a series hybrid extended-range electric powertrain. However, other powertrain configurations, such as all electric powertrains, parallel hybrid electric powertrains or internal combustion powertrains may be employed within the scope of the claims recited below. Also, the vehicle 10 may be any one of a number of different types of vehicles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

As illustrated in FIG. 1, the vehicle 10 includes a decklid 42 that is moveable between a closed position and an open position 42' via a hinge box (not shown in FIG. 1) and a hinge strap 44. The decklid provides a closure for a trunk compartment, which in some embodiments is positioned in the rear of the vehicle 10. In other embodiments, the decklid may be positioned in the front of the vehicle with the powertrain 22 arranged in the rear or mid-vehicle position. In an SUV embodiment, the decklid 42 may comprise a lift-gate that provides a closure for a cargo compartment.

Figure 2:
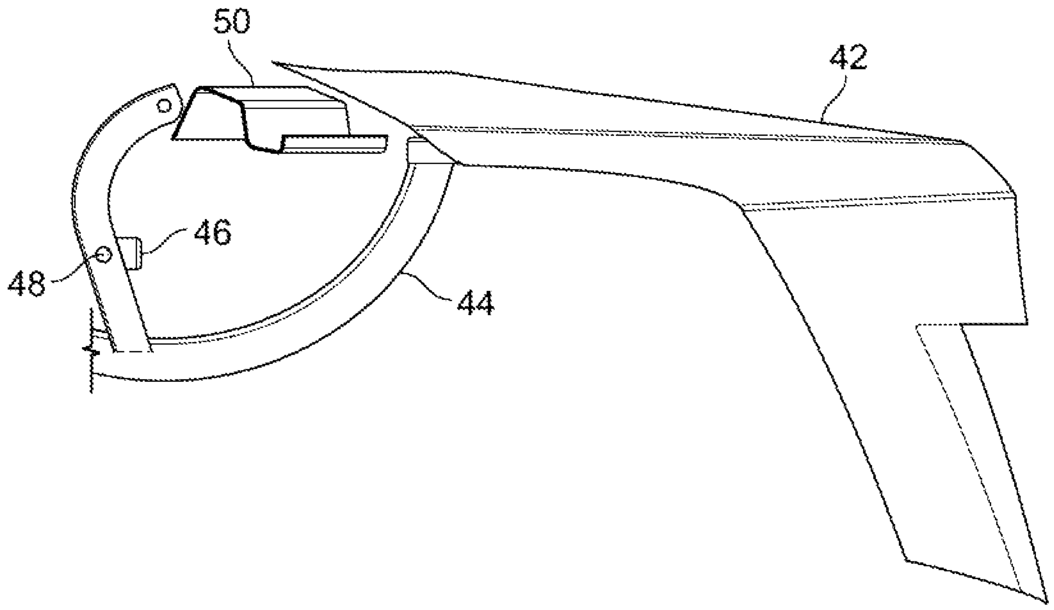
FIG. 2 is an illustration of the decklid of the vehicle of FIG. 1 in a closed position.

FIG. 2 is a more detailed illustration of the decklid 42 in the closed position. According to exemplary embodiments, a magnetic element 46 is connected via a coupling (48) to the hinge strap 44. In one embodiment, the magnetic element comprises a single magnet (e.g., rare earth magnet or electromagnet), while in other embodiments (discussed below), the magnetic element 46 comprises a magnetic assembly. The purpose of magnetic element 46 is to provide a decklid hold-open feature by magnetically coupling to a body support member 50 (e.g., a portion of the vehicle body (14 in FIG. 1) such as, for example, a rear window support member). This magnetic coupling provides additional force (over that provided by any springs or gas struts employed) to retain the decklid in the open position.

Figure 3A:
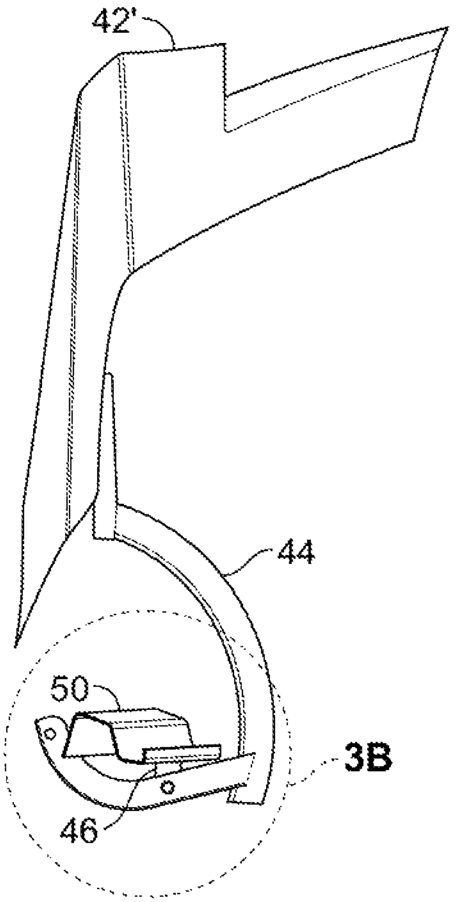
FIGS. 3A and 3B are illustrations of the decklid of the vehicle of FIG. 1 in an open position.
Figure 3B:
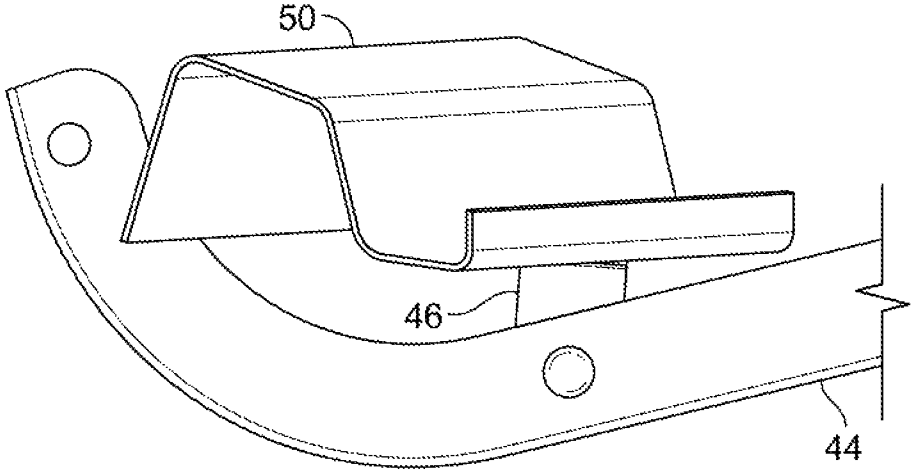

FIGS. 3A and 3B are illustrations of the decklid 42' in an open position. As shown in FIG. 3A, the decklid 42' has moved to the open position, causing the hinge strap 44 to move the magnetic element 46 into contact with the body member 50 (e.g., rear window support member). It will be appreciated that in another embodiment, the position of the magnetic element 46 may be positioned on the body member 50, which magnetically couples to the hinge strap 44. Once magnetically coupled to the body member 50, the magnetic element assists in holding decklid 42' in the open position, which reduces the possibility of the decklid 42' unexpectedly closing. With the additional holding power of the magnetic element 46, the hold-open force required of the springs or gas struts employed may be reduced, which in turn, may reduce the physical size of the spring or gas strut and the space required to accommodate them in the trunk or cargo area of the vehicle.

Figure 4A:
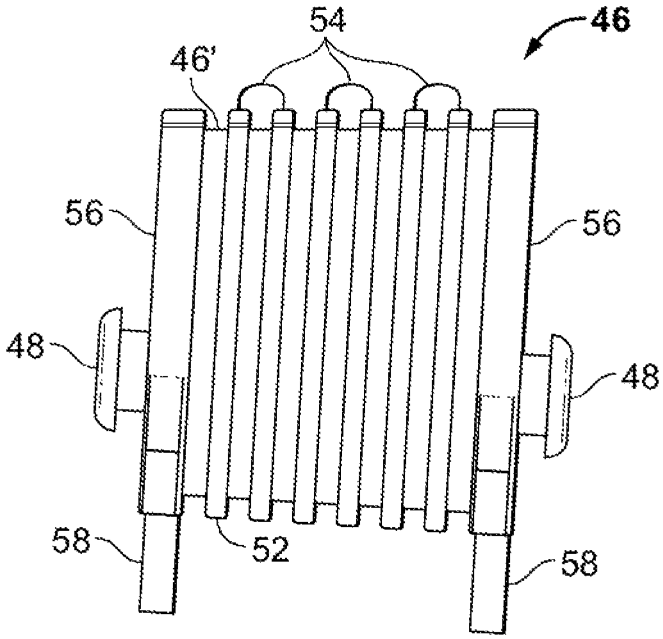
FIGS. 4A-4C are illustrations of the magnetic element of the FIG. 2 accordingly to exemplary embodiments.
Figure 4B:
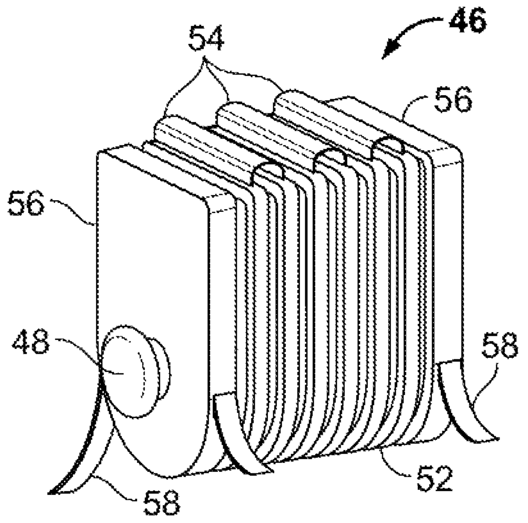
Figure 4C:
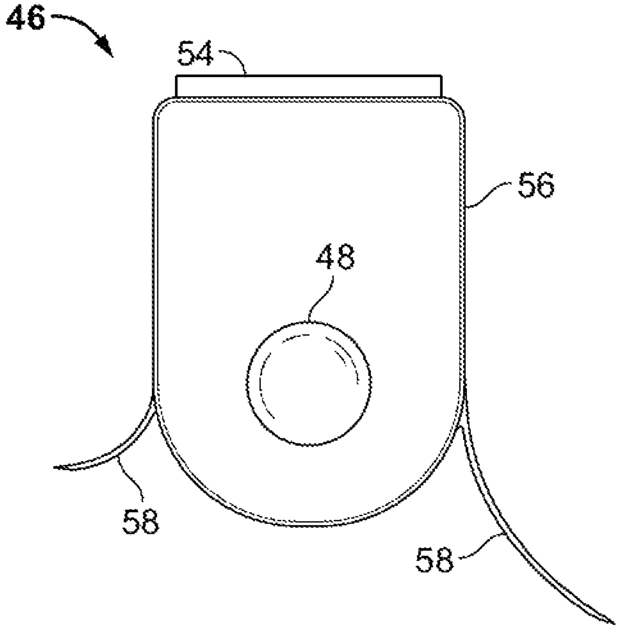

FIGS. 4A-4C are illustrations of one embodiment of the magnetic element 46. In this embodiment, the magnetic element comprises a magnetic assembly including a plurality of magnets 46' interleaved with a plurality of insulating spacers 52. The insulating spacers distribute the magnetic coupling ability of the magnets 46' over a larger area than that offered by a single magnet of equivalent magnetic coupling ability. The plurality of insulating spacers may be of a plastic or other non-magnetic material, and in one embodiment are formed as flat pairs of insulators having a compliant member 54 therebetween. Once folded to be used in the magnetic assembly, the compliant member 54 becomes a living hinge, which is deformable (being compliant) when the magnetic element 46 magnetically couples to a body member (see FIG. 3B). As the compliant living hinge 54 deforms, it provides a cushioning effect at the moment of contact and assists in reducing any metallic contact sound (i.e., "click") that might be produced when the magnetic element 46 magnetically couples to a body member to retain the decklid in the open position. The illustrated embodiment of the magnetic assembly also includes end caps 56, which provide a mounting member 48 for coupling the magnetic element 46 to the hinge strap 44 (see FIG. 2). The end caps also provide a loading force via spring elements 58. During assembly, the spring elements 58 are slightly compressed and then the mounting member 48 holds the magnetic element 46 in place and under a loading force, which aids in reducing undesired noise (e.g., rattle) in the passenger compartment of the vehicle 10.

Figure 5:
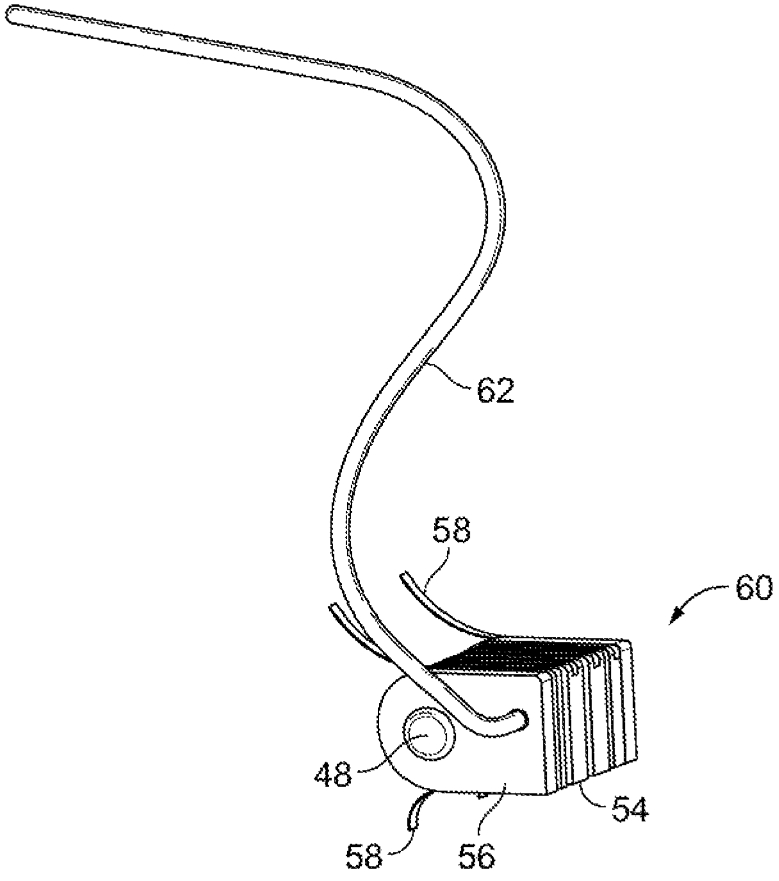
FIG. 5 illustrates an alternate embodiment of the magnetic element suitable for use in exemplary embodiments.

FIG. 5 illustrates an alternate embodiment of the magnetic element 60 suitable for use in exemplary embodiments. In this embodiment, the magnetic element 60 comprises an electromagnet. The electromagnetic element 60 may be a single electromagnet or may be an electromagnetic embodiment of the magnetic assembly 46 (see FIGS. 4A-4C). The electromagnet element 60 is activated by a conductor 62 that selectively applies power to the electromagnet. In one embodiment, the conductor 62 is coupled to a switch (not shown) that activates the electromagnetic element 60 upon moving the decklid 42 from the closed position toward the open position. In one embodiment, upon returning the decklid 42 to the closed position, the electromagnetic element 60 could be deactivated to conserve energy until the electromagnetic element was again need to assist in retaining the decklid 42' in the open position. In other embodiments, the electromagnetic element 60 could be deactivated upon the decklid moving away from the open position or toward the closed position.

Figure 6A:
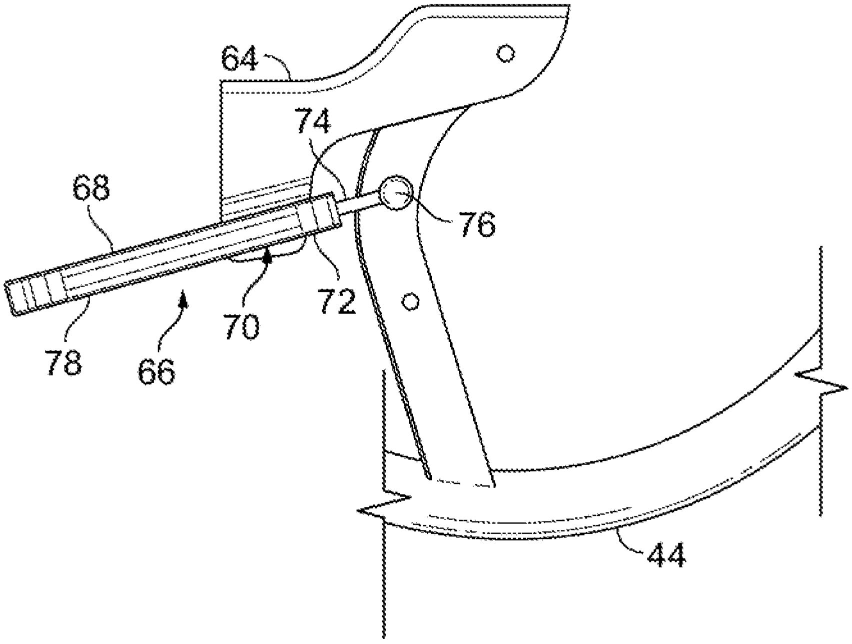
FIGS. 6A and 6B are illustrations of another alternate embodiment of the magnetic element for use in exemplary embodiments.
Figure 6B:
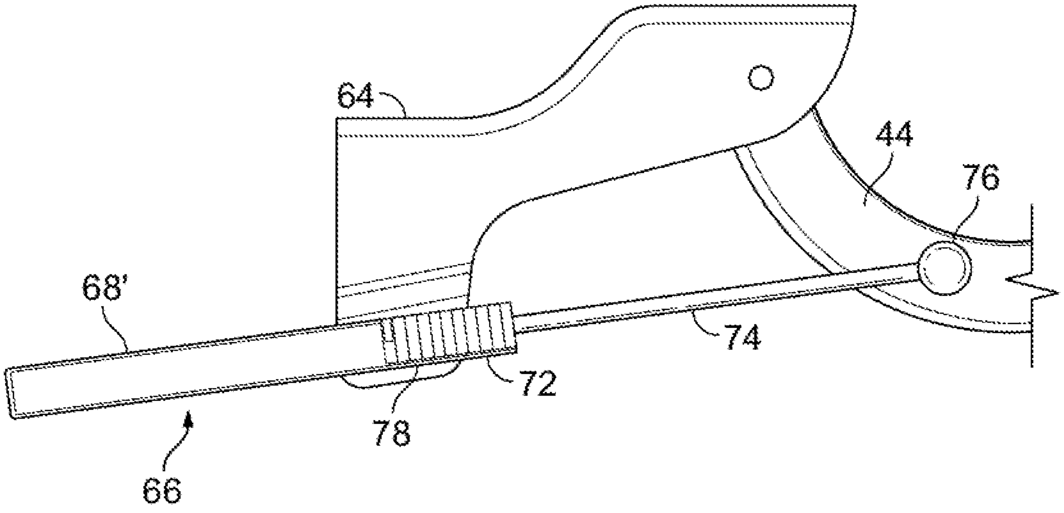

FIGS. 6A and 6B are illustrations of another alternate embodiment of a magnetic element for use in exemplary embodiments. As shown in FIG. 6A, the hinge strap 44 is coupled to a hinge box 64 and has a magnetic assembly 66 coupled therebetween. The magnetic assembly 66 comprises a body (e.g., tube or cylinder) 68 that is coupled 70 (mounting point is behind the body 68) to the hinge box 64. The body 68 includes a first magnet 72 of a first polarity (either North or South) positioned at one end of the body 68. A rod 74 is connected via a coupling 76 at a proximal end to the hinge strap 44 and co-axially aligned with the body 68 to translate into and out of the body 68 as the decklid moves between the closed position and the open position. In the illustrated embodiment, the rod 74 translates through an opening in the first magnet 72. The rod 74 includes a second magnet 78 having the opposite polarity than the first magnet (since opposite magnetic poles attract) coupled at a distal end of the rod 74, which will move toward or away from the first magnet 72 as the rod 74 translates within the body 68. As the decklid (not shown in FIG. 6) moves from the closed position (FIG. 6A) to the open position (FIG. 6B) the second magnet 78 becomes magnetically coupled to the first magnet 72, which assists in retaining the decklid in the open position. In one embodiment, the body 68 comprises a gas strut having the first magnet 72 and the second magnet 78 integrated therein.

Accordingly, a magnetic decklid hold-open feature is provided for a vehicle. With the additional holding power of the magnetic element, the hold-open force required of the springs or gas struts employed may be reduced, which in turn, may reduce the physical size of the spring or gas strut and the space required to accommodate them in the trunk or cargo area of the vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system, comprising:

a decklid for a vehicle;

a hinge strap coupled to a body of the vehicle and the decklid facilitating the decklid moving between a closed position and an open position; and a magnetic element coupled to the hinge strap to magnetically retain the decklid in the open position.

2. The system of claim 1, wherein the magnetic element is mounted on the hinge strap in a position to magnetically couple to a portion of the body when the decklid is in the open position.

3. The system of claim 1, wherein the magnetic element comprises an electromagnetic assembly.

4. The system of claim 3, wherein the electromagnetic assembly is activated upon the decklid moving toward the open position.

5. The system of claim 4, wherein the electromagnetic assembly is deactivated upon the decklid returning to the closed position.

6. The system of claim 1, further comprising a hinge box, and wherein the magnetic element further comprises an assembly having a pair of magnets of opposite polarity coupled between the hinge box and the hinge strap and configured to magnetically couple the pair of magnets when the decklid moves to the open position.

7. The system of claim 6, wherein the assembly has a pair of magnets of opposite polarity and further comprises a gas strut.

8. The system of claim 1, further comprising a hinge box, and wherein the magnetic element further comprises:

a first magnet with a first polarity positioned within a body coupled to the hinge box; and a second magnet with an opposite polarity mounted on a rod coupled to the hinge strap, the rod co-axially arranged to translate within the body when the decklid moves between the closed position and the open position;

wherein, the rod moves the second magnet toward the first magnet within the body to magnetically couple the first and second magnets when the decklid moves into the open position.

9. The system of claim 1, wherein the magnetic element further comprises an assembly having a plurality of magnets interleaved with a plurality of insulating spacers.

10. The system of claim 9, wherein pairs of the plurality of insulating spacers have a deformable hinge therebetween.

11. The system of claim 10, wherein the deformable hinge between the pairs of insulating spacers deforms when the decklid moves into the open position.

12. The system of claim 9, wherein the assembly includes end-caps for the assembly, the end caps having mounting members and providing a loading force to retain the assembly coupled to the hinge strap.

13. The system of claim 1, further comprising a powertrain providing power to wheels to propel the vehicle.

14. A system, comprising:

a decklid for a vehicle;

a hinge strap coupled to a body of the vehicle and the decklid facilitating the decklid moving between a closed position and an open position; and a magnetic assembly coupled to the hinge strap, comprising:

a plurality of magnets interleaved with a plurality of insulating spacers, pairs of the plurality of insulating spacers having a deformable hinge therebetween; and end caps having mounting members and providing a loading force to retain the magnetic assembly coupled to the hinge strap;

wherein the magnetic assembly magnetically couples to a portion of the body causing the deformable hinge between the pairs of insulating spacers to deform to retain the decklid in the open position.

15. A vehicle, comprising:

a body for the vehicle;

a decklid providing a closure for a portion of the body;

a powertrain mounted within the body for providing power to wheels to propel the vehicle;

a hinge strap coupled to the body of the vehicle and the decklid facilitating the decklid moving between a closed position and an open position; and a magnetic element coupled to the hinge strap to magnetically retain the decklid in the open position.

16. The vehicle of claim 15, wherein the magnetic element is mounted on the hinge strap in a position to magnetically couple to a portion of the body when the decklid is in the open position.

17. The vehicle of claim 16, wherein the magnetic element comprises an electromagnetic assembly.

18. The vehicle of claim 17, wherein the electromagnetic assembly is activated upon the decklid moving toward the open position.

19. The vehicle of claim 17, wherein the electromagnetic assembly is deactivated upon the decklid returning to the closed position.

20. The vehicle of claim 19, further comprising a hinge box, and wherein the magnetic element further comprises an assembly having a pair of magnets of opposite polarity coupled between the hinge box and the hinge strap and configured to magnetically couple the pair of magnets when the decklid moves to the open position.

* * * * *